's

United States Patent
Suzuki

[11] Patent Number: 5,987,191
[45] Date of Patent: Nov. 16, 1999

[54] MODEL IMAGE REGISTRATION METHOD AND APPARATUS THEREFOR

[75] Inventor: Takashi Suzuki, Kyoto, Japan

[73] Assignee: Omron Co., Kyoto, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/528,554

[22] Filed: Sep. 15, 1995

[30] Foreign Application Priority Data

Sep. 21, 1994 [JP] Japan .................................. 6-226170

[51] Int. Cl.⁶ .............................. G06K 9/00; G06K 9/32; G06K 9/36
[52] U.S. Cl. .......................... 382/294; 382/151; 382/289; 382/290; 382/293; 382/295; 382/296; 382/297
[58] Field of Search .................................... 382/289, 290, 382/294, 295, 296, 297, 173, 155, 159, 161, 151, 209, 214, 217, 293

[56] References Cited

U.S. PATENT DOCUMENTS

| | | | |
|---|---|---|---|
| 5,077,811 | 12/1991 | Onda | 382/297 |
| 5,093,653 | 3/1992 | Ikehira | 382/290 |
| 5,131,740 | 7/1992 | Maekawa | 356/3.14 |
| 5,325,447 | 6/1994 | Vogt, III | 382/102 |
| 5,333,209 | 7/1994 | Sinden et al. | 382/294 |
| 5,430,809 | 7/1995 | Tomitaka | 382/173 |

FOREIGN PATENT DOCUMENTS 0 525 513 A3   3/1993   European Pat. Off. .................. 15/70

*Primary Examiner*—Phuoc Tran
*Assistant Examiner*—Daniel G. Mariam
*Attorney, Agent, or Firm*—Dickstein, Shapiro, Morin & Oshinsky LLP

[57] ABSTRACT

In the present invention, an image is registered as a model image by setting a window after calculating a main axis angle of the model image stored in an image memory, the main axis angle being defined on a display screen, and then rotating the model image so that the main axis angle becomes a predetermined angle.

8 Claims, 6 Drawing Sheets

MODEL IMAGE REGISTRATION METHOD AND APPARATUS THEREFOR

BACKGROUND OF THE INVENTION

1. Field of the Invention

The invention relates to a method of registering a model image serving as a reference image for image inspection, and an apparatus therefor.

2. Description of the Related Art

In a device designed to sequentially inspect the same kind of objects by means of image processing, such as an image processor for inspecting a product carried on a conveyor, an inspection is carried out in the following way. A model image serving as a reference image during image inspection is registered in advance; such a part of a target image taken by the camera as corresponding to the model image is extracted; and the extracted image is compared with the model image.

Some conventional model image registration methods carried out by the image processor for image inspection are characterized as follows.

(1) A model image is registered by manually positioning a target model, a camera, or the like so that the model image becomes as horizontal or vertical as possible on a display screen of a monitor.

(2) A model image is registered (or re-registered) by stopping a target model if the target model is moving along a line such as a conveyor.

(3) A model image is registered part by part while consecutively rotating a target model manually if the target model is not arranged substantially horizontally, but arranged substantially concentric.

However, the aforementioned methods address the following shortcomings.

With respect to case (1), since the target model, the camera, or the like have to be positioned manually so that the model image becomes substantially horizontal or vertical, the positioning operation not only is cumbersome but also entails skill.

With respect to case (2), since the line have to be stopped at the time the model image is registered (re-registered), the problem of reducing productivity arises. In addition, the operation of stopping and resuming the line have to be additionally performed.

With respect to case (3), the positioning operation that entails more time than in the case (1) is required.

SUMMARY OF THE INVENTION

It is an object of the present invention to provide a model registration method in which a target model having been once stored in the image memory is rotated on an image memory, and an apparatus therefor.

In the model image registration method of the present invention, a image is registered after calculating a main axis angle of the model image stored in the image memory on a display screen, and thereafter rotating the model image so that the main axis angle becomes a predetermined angle, for example, substantially 0° or 90°.

Also in the invention, a model image is registered part by part while rotating the model image after setting a window enclosing the model image stored in the image memory and moving the model image so that the centroid of the window coincides with the center of the display screen.

In the model image registration method characterized as rotating the model image so that the main axis angle becomes a predetermined angle, for example, 0° or 90° after the main axis angle has been calculated, the main axis angle θc of a model image consisting of a character string ABCD is calculated, and the model image is thereafter rotated so that the main axis angle θc becomes substantially 0° as shown in FIG. 1A. The main axis angle θc is the angle formed by an axis on which the angular moment of the model image is minimized with respect to the horizontal axis. Usually, the main axis angle passes through the center of the model image. Let it now be assumed that a model image is registered without rotating the model image such as shown in FIG. 1A. When a window W' is set to register, e.g., the character B, it is not possible to register only the character B correctly because part of the characters A and C adjacent to the window W' is covered by the window. However, if the model image is rotated so that the main axis angle becomes 0°, it is possible to set a window W' that can cover only the character B. Therefore, each character can be registered independently.

Moreover, the method of registering a model image by rotating the model image while moving is applicable to the case where characters or the like to be registered are arranged on an arc such as shown in FIG. 1B. In the case of such model image, the model image is not only moved close to the center of the display screen but also registered sequentially while rotating. Therefore, the setting of the window W becomes easy, which in turn allows the model image enclosed by the window W to be arranged in the frontal position.

BRIEF DESCRIPTION OF THE DRAWINGS

In the accompanying drawings.

PREFERRED EMBODIMENTS OF THE INVENTION

Preferred embodiments of the present invention will be described in detail referring to the accompanying drawings as follows.

Figure 1A:
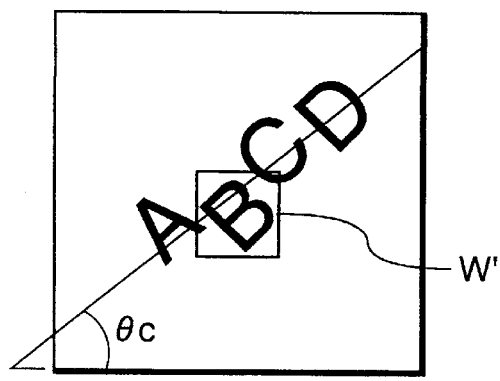
FIGS. 1A and 1B are diagrams illustrative of a model image registration method of the present invention.
Figure 1B:
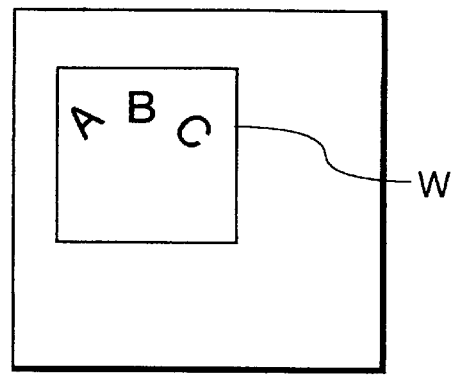
Figure 1B:
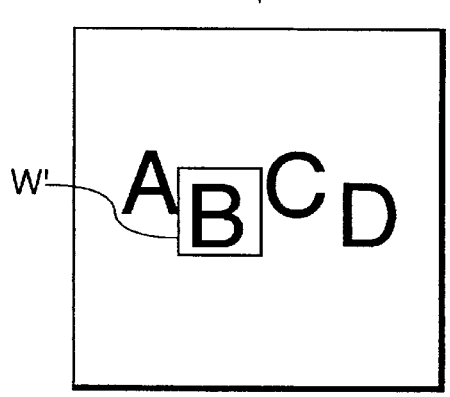
Figure 1B:
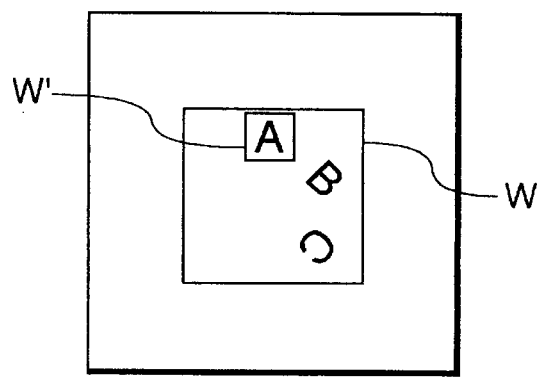
Figure 2:
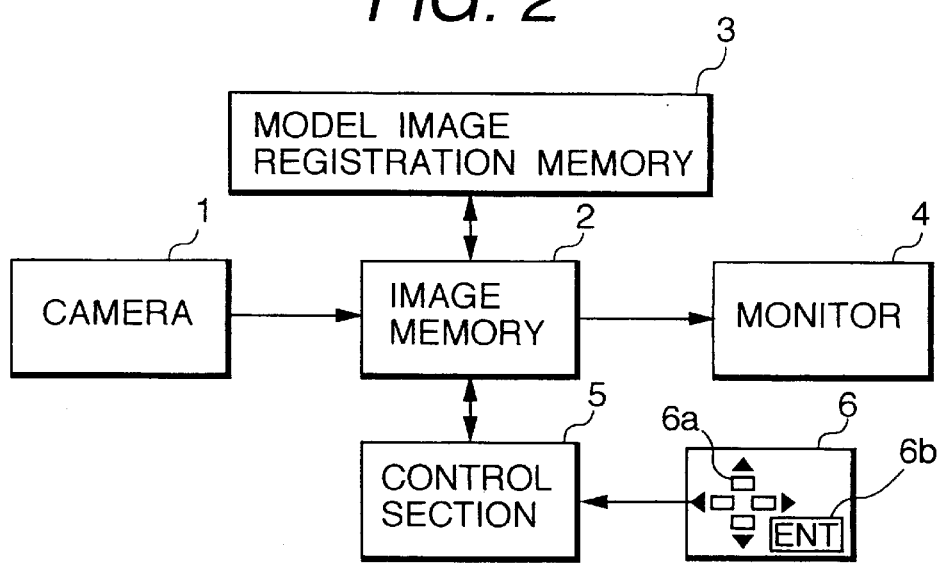
FIG. 2 is a diagram showing the configuration of an image processor to which the model image registration method of the invention is applied.

FIG. 2 is a diagram showing the configuration of an image processor to which a model image registration method of the invention is applied.

A camera 1 takes the image of an object that is either stationary or moving on a line such as a conveyor, and the image data is stored in an image memory 2. If the image stored in the image memory 2 is a model image, such model image is stored in a model image registration memory 3. It may be noted that the model image becomes a reference image for inspecting and measuring an object to be inspected. The model image is to be compared with the image of the object to be inspected. Further, to inspect and measure an object using this image processor, an image taken by the camera 1 and stored in the image memory 2 is compared with a model image that has been stored in the model image registration memory 3. A monitor 4 displays a image stored in the image memory 2, is used for registering a model image, and displays a menu and the like for control purposes. A control section 5 controls the image processor. Input keys 6 are used, e.g., to set a window on the display screen, select a menu, and register a model image.

FIGS. 3A to 3F are diagrams illustrative of how an image is registered after calculating the main axis angle of a model image and rotating the model image.

Figure 3A:
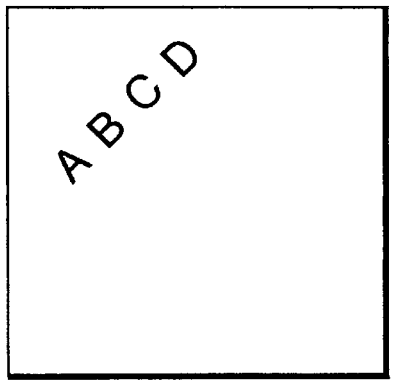
FIGS. 3A to 3F are diagrams illustrative of the model image registration method, which is a first embodiment of the invention.

If a model image "ABCD" is displayed obliquely as shown in FIG. 3A, from the fact that this display is as taken from the camera 1, one can assume that either the model image is out of position or that the angle of the camera is displaced. With the monitor image shown in FIG. 3A being displayed on the display screen of the monitor 4, a window W is set on the display screen by using a cursor 6a and an ENT key 6b of the input keys 6 in the following way. First, the upper left coordinates (x1, y1) are determined and the ENT key 6b is pressed, and then the lower right corner coordinates (x2, y2) are determined by moving the cursor 6a and the ENT key 6b is thereafter pressed so that the character string ABCD is accommodated within the rectangular window W. Then, a main axis angle θc is calculated as shown in FIG. 3C. The main axis angle θc is defined as an angle formed by a line (axis) that minimizes the angular moment of the model image (ABCD) with respect to the horizontal line. In FIG. 3D, both the model image and the window W are rotated so that the angle θc becomes horizontal (0°). As a result of the rotation, the model image ABCD becomes a horizontal, correctly positioned image as shown in FIG. 3D. In this embodiment, both the model image and the window W are moved from the FIG. 3D condition so that the centroid of the window W coincides with the center of the display image. FIG. 3E shows this relocated condition. As a result of this operation, the model image ABCD is moved substantially to the center of the display screen. Successively, the window W is deleted from the display screen, and the model image is thereafter registered from the left character A to the right characters. That is, first, a window W' that encloses the character A is similarly set by operating the input keys 6 as in the case of the window W. Then, the character A is registered in the model image registration memory 3 by performing a predetermined operation. Similarly, the characters B, C, D are registered to complete the registration of the model image.

Figure 3B:
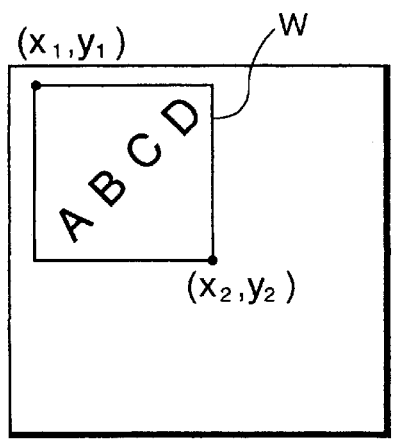
Figure 3C:
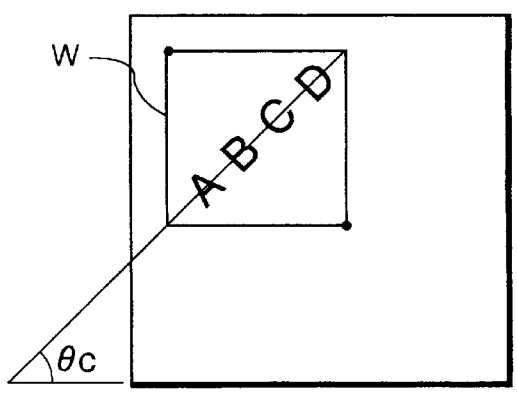
Figure 3D:
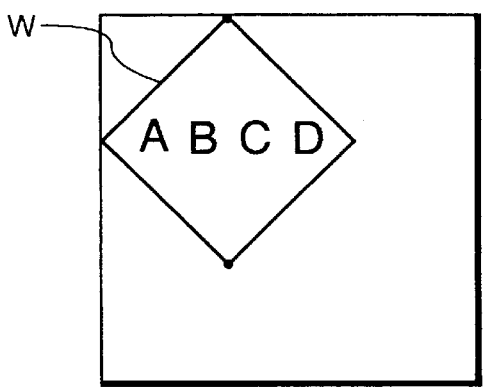
Figure 3E:
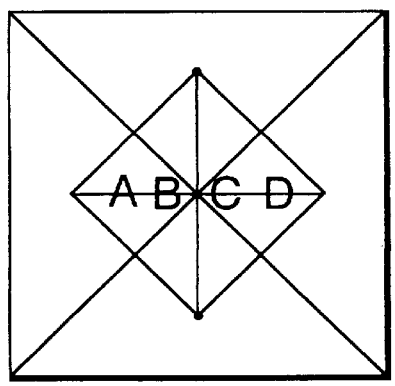
Figure 3F:
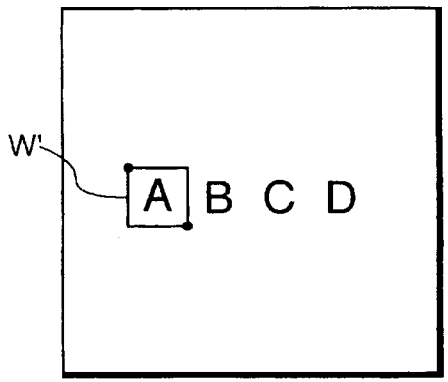
Figure 4:
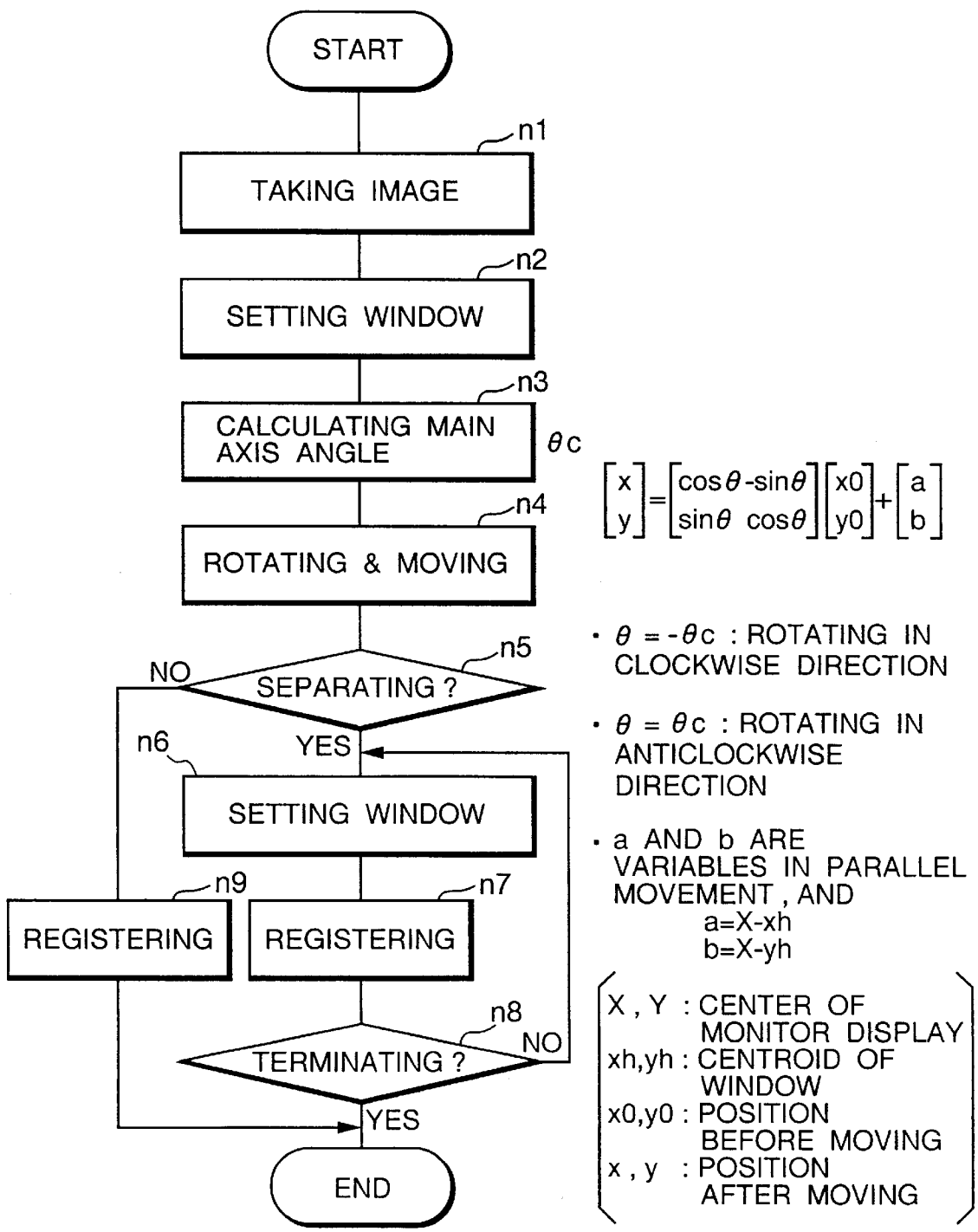
FIG. 4 is a flowchart showing an operational procedure of a control section for executing the model image registration method shown in FIG. 3.

FIG. 4 is a flowchart showing the operation of the model image registration method of FIG. 3.

First, an image is taken by the camera 1 and stored in the image memory 2 in step n1. Then, the window W is set through the input keys 6 (step n2), and the main axis angle θc is calculated in step n3. Both the model image and the window W are rotated and moved parallel in the X-axis direction as well as in the Y-axis direction (step n4). With respect to the rotation and movement in the case of setting the main axis angle to θc, the angle of rotation and the moving distances are determined by the equation indicated on the right of the flowchart.

It is the condition shown in FIG. 3E that is obtained after the n4 operation has been completed. Successively, the window W is deleted, and whether or not the model image have to be separated into the respective characters is judged. If the answer to the judgment is negative, the whole model image is registered to terminate the processing (step n9). If the answer to the judgment is positive, a first window W' is set in step n6 as shown in FIG. 3F to separate the model image, and the separated piece is registered (step n7). This operation is performed for the rest of the separated pieces of the model image.

Figure 5:
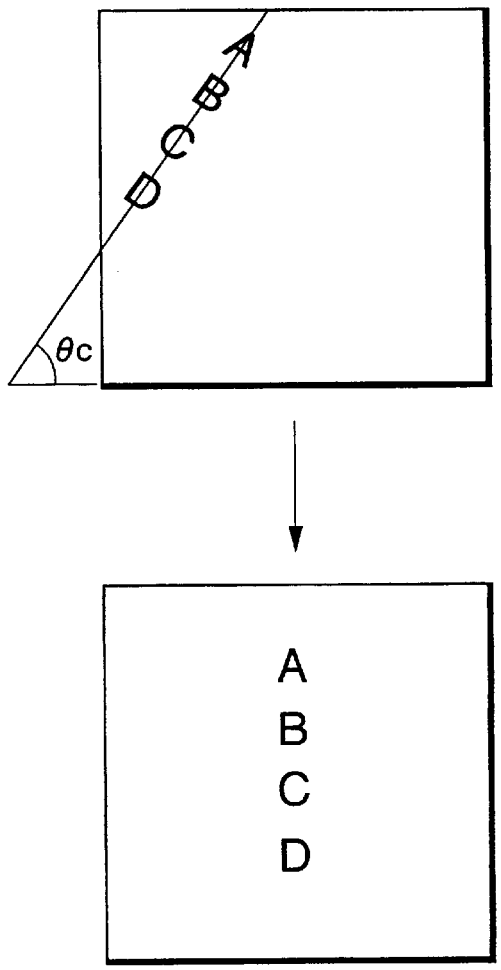
FIG. 5 is a diagram illustrative of another mode of operation of the embodiment shown in FIG. 3.

While both the model image and the window W are moved parallel in the X-axis direction as well as in the Y-axis direction in the above embodiment, the model image is rearranged to be horizontal in position and can be registered in such horizontal position, as long as a step is taken to scan to rotate the model image so that the main axis angle θc becomes substantially 0° after the main axis angle has been calculated. Therefore, parallel movement in the X-axis direction and in the Y-axis direction is not necessary in this case. The reason why the model image is moved parallel is to facilitate the registration by moving the model image toward the center of the display screen. Further, while the model image is rotated so that the main axis angle θc becomes substantially 0°, certain model images can be rotated so that the main axis angle becomes 90°. For example, a model image such as shown in FIG. 5, it is desirable to rotate the model image so that the main axis angle θc becomes 90°.

A second embodiment of the present invention will be described as follows.

FIGS. 6A to 6E are diagrams illustrative of a registration method designed to sequentially register a model image while rotating the model image.

Figure 6A:
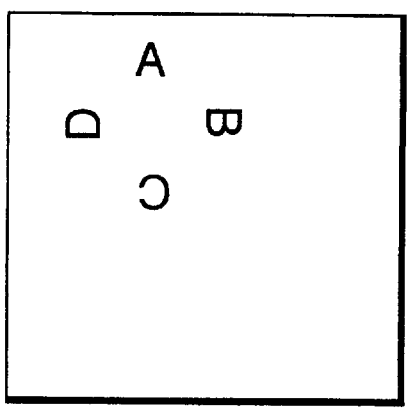
FIGS. 6A to 6E are diagrams illustrative of a model image registration method, which is a second embodiment of the present invention.
Figure 6B:
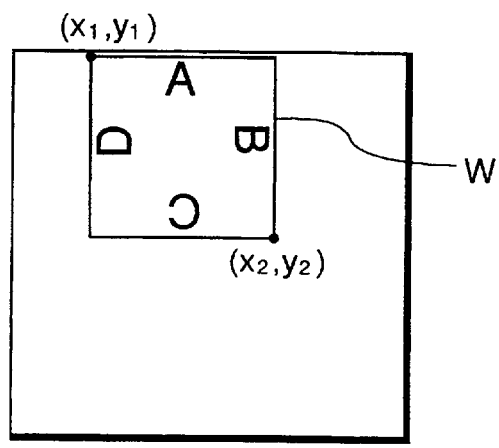
Figure 6C:
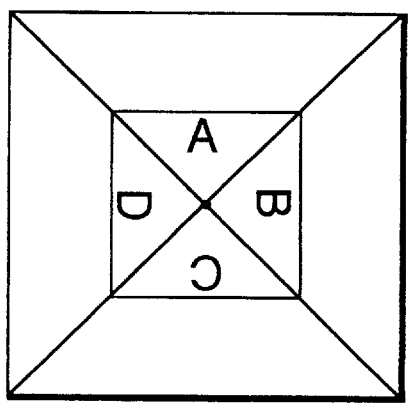
Figure 6D:
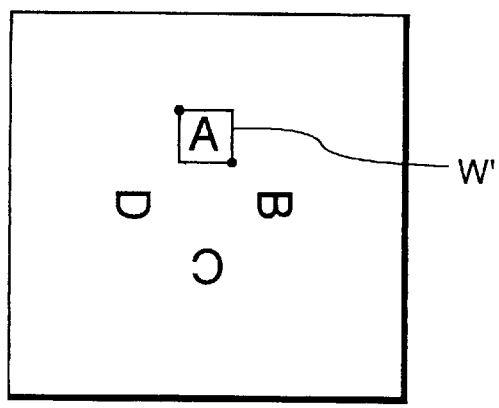
Figure 6E:
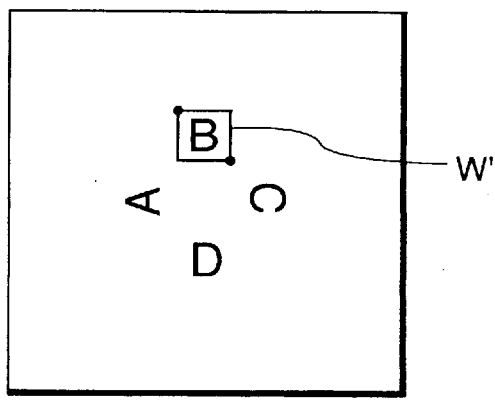

As shown in FIG. 6A, in the case where a model image taken by the camera 1 is so arranged that the characters A, B, C, D are rotated, the window W that encloses the whole model image such as shown in FIG. 6B is similarly set by the method shown in FIG. 3B, and then both the window W and the model image are moved parallel in the X-axis direction as well as in the Y-axis direction so that the centroid of the window W coincides with the center of the display screen as shown in FIG. 6C. Then, by rotating the whole model image little by little through the cursor 6a of the input keys 6, a window W' for separating the model image into pieces is set to enclose the first character A when such character A has come to an appropriate position. A model image registration for the character A is thereafter made. Then, the whole model image is rotated little by little through the cursor 6a, and a window W' is set to separate the next character B when such character B has come to the appropriate position. A model image registration for the character B is thereafter made. Similarly, model image registrations for the characters C and D are made. Thus, the registration is made using the window W' to separate the model image with each character being in the frontal position.

Figure 7:
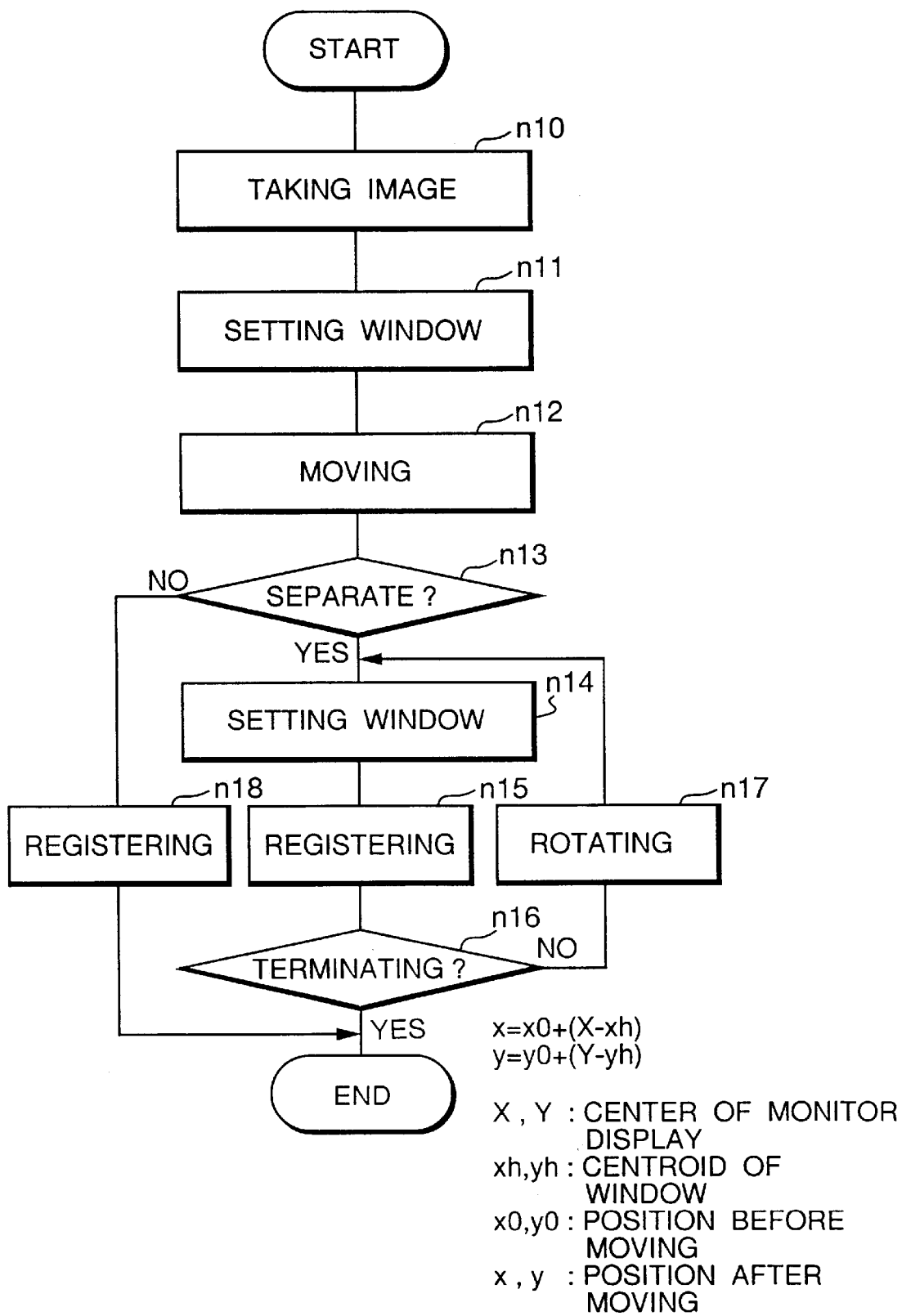
FIG. 7 is a flowchart showing an operational procedure of a control section for executing the model image registration method shown in FIG. 6.

FIG. 7 is a flowchart showing the procedure of the above registration method in the second embodiment.

The model image is stored in step n10. Then, the window W is set (step n11), and both the model image and the window W are moved parallel thereafter in the X-axis direction as well as in the Y-axis direction (step n12). It may be noted that moving parallel distances in the X-axis direction as well as in the Y-axis direction are expressed by the equations indicated on the right of step n12.

Then, the window W is deleted, and the characters are separated one by one in steps n13 to n18 to make their registrations. That is, a window W' for separating the model image is set in step n14; the separated piece is registered in step n15; and the monitored image is rotated by operating the cursor 6a by a desired angle (step n17). The processing in steps n14 to n18 is performed until the registration of all the characters is completed. If there is no piece to be separated, then the model image is registered as it is.

Figure 8:
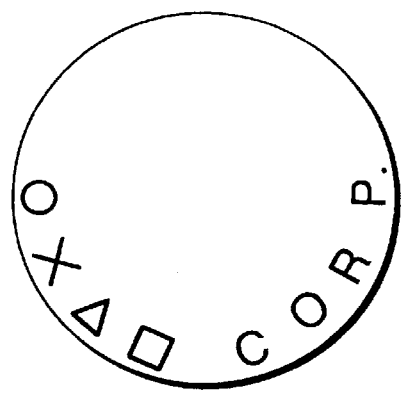
FIG. 8 is a plan view of an object to be inspected suitably by the model image registration method shown in FIGS. 6A to 6E and 7.

It may be noted that a cap having a character string arranged along the periphery such as shown in FIG. 8 is an exemplary object to be inspected in the case of registering a model image while rotating the model image such as in the registration method shown in FIGS. 6 and 7.

According to the present invention, a model image is registered after stored in the memory by the camera. Therefore, even if positioned obliquely, the model image can be registered in the correct position without rearranging the model image or the camera. As a result, no special positioning operation is required, which not only dispenses with a jig or skill, but also allows a registration to be made extremely quickly. Therefore, it is no longer necessary to take the trouble to stop the conveyor line even if a model object is moving along the line. Therefore, the problem of reducing productivity is not brought about.

What is claimed is:

1. A model image registration method, comprising the steps of:

storing an image taken by image taking means in an image memory;

setting a first window enclosing a first portion of said image stored in the image memory;

rotating said image so that a portion thereof enclosed by said first window is at a predetermined angle;

setting a second window enclosing a second portion of said first portion of said image at said predetermined angle;

registering said second portion of said image enclosed by said second window as a model image serving as a reference image; and repeating the previous three steps for additional portions of said first portion of image.

2. A model image registration method according to claim 1, wherein said predetermined angle is at least one of substantially 0° and substantially 90°.

3. The method of claim 1, further comprising the step of:

moving said image so that the centroid of said first window coincides with the center of a display screen.

4. The method of claim 1, wherein an angle of the first portion before the rotating step is the angle formed between an axis about which the angular moment of the portion is minimized and a horizontal line.

5. A model image registration apparatus comprising:

imaging means for taking an image, an image memory;

storage means for storing the image taken by the imaging means in the image memory;

first window means for setting a first window enclosing a first portion of said image stored in the image memory;

rotating means for rotating said image so that the portion thereof enclosed by said first window is at a predetermined angle;

means for repetitively setting a second window enclosing different second portions of said first portion and registering each of said second portions as a model image serving as a reference image.

6. A model image registration apparatus according to claim 5, wherein said predetermined angle is at least one of substantially 0° and substantially 90°.

7. The apparatus of claim 5, further comprising:

centering means for moving said image so that the centroid of said first window coincides with the center of a display screen.

8. The apparatus of claim 5, further comprising means for determining an axis about which the angular moment of the first portion is minimized and calculating an angle between the axis and a horizontal line.

* * * * *